United States Patent
Mortel et al.

(10) Patent No.: US 9,046,946 B2
(45) Date of Patent: Jun. 2, 2015

(54) SYSTEM AND METHOD OF DETERMINING STYLUS LOCATION ON TOUCH-SENSITIVE DISPLAY

(71) Applicant: RESEARCH IN MOTION LIMITED, Waterloo (CA)

(72) Inventors: Melecio Leano Mortel, Waterloo (CA); Amit Pal Singh, Waterloo (CA); John Edward Dolson, Carp (CA); Cornel Mercea, Waterloo (CA)

(73) Assignee: BlackBerry Limited, Waterloo (CA)

( * ) Notice: Subject to any disclaimer, the term of this patent is extended or adjusted under 35 U.S.C. 154(b) by 78 days.

(21) Appl. No.: 13/782,926

(22) Filed: Mar. 1, 2013

(65) Prior Publication Data

US 2014/0247228 A1    Sep. 4, 2014

(51) Int. Cl.
G06F 3/041  (2006.01)
G06F 3/0354 (2013.01)
G06F 3/044  (2006.01)

(52) U.S. Cl.
CPC .............. *G06F 3/041* (2013.01); *G06F 3/0416* (2013.01); *G06F 3/03545* (2013.01); *G06F 3/044* (2013.01)

(58) Field of Classification Search
USPC .......................................... 345/173, 179, 174
See application file for complete search history.

(56) References Cited

U.S. PATENT DOCUMENTS

| | | | |
|---|---|---|---|
| 2002/0067350 A1* | 6/2002 | Ben Ayed | 345/179 |
| 2008/0106520 A1* | 5/2008 | Free et al. | 345/173 |
| 2010/0321333 A1* | 12/2010 | Oda et al. | 345/174 |
| 2011/0095990 A1* | 4/2011 | Philipp et al. | 345/173 |
| 2012/0086659 A1* | 4/2012 | Perlin et al. | 345/173 |
| 2012/0092270 A1 | 4/2012 | Lyon et al. | |
| 2012/0127110 A1* | 5/2012 | Amm et al. | 345/174 |
| 2012/0127114 A1 | 5/2012 | Weaver et al. | |
| 2012/0153026 A1 | 6/2012 | Bohn et al. | |

FOREIGN PATENT DOCUMENTS

EP    2560079 A1    2/2013

OTHER PUBLICATIONS

Extended European Search Report dated Jul. 26, 2013, issued in respect of corresponding European Patent Application No. 13157512.8.

* cited by examiner

*Primary Examiner* — Linh N Hoffner

(74) *Attorney, Agent, or Firm* — Geoffrey deKleine; Borden Ladner Gervais LLP

(57) ABSTRACT

An electronic device includes a touch-sensitive display including a plurality of touch sensors configured to detect touches on the touch-sensitive display. The touch sensors include a plurality of touch sensor jumpers that are spaced apart in the touch-sensitive display. The touch-sensor jumpers include attributes to facilitate identification of a location of a stylus relative to the jumpers. The stylus includes a device configured to obtain data relating to an attribute of at least one of the touch sensor jumpers of the touch-sensitive display, a processor operably coupled to the device to receive the data, and a transmitter operably coupled to the processor and configured to transmit to the electronic device, information based on the data. The electronic device includes a receiver that receives the information and a processor that is configured to determine the location of the stylus based on the information.

20 Claims, 4 Drawing Sheets

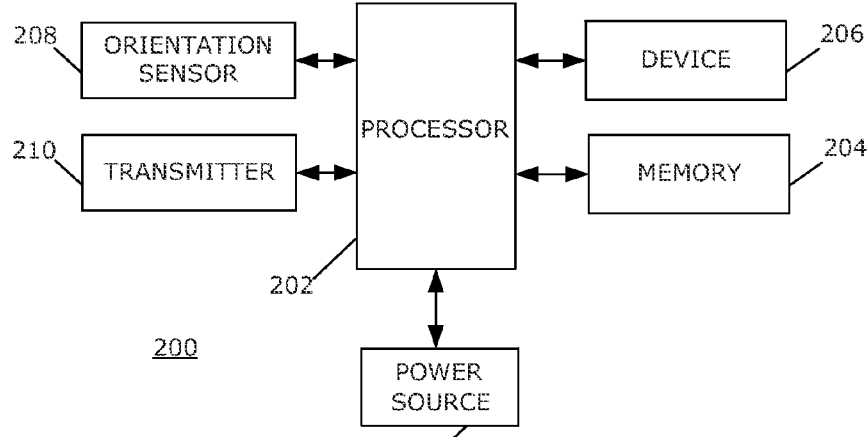
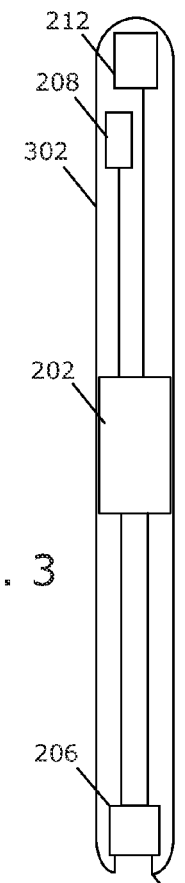
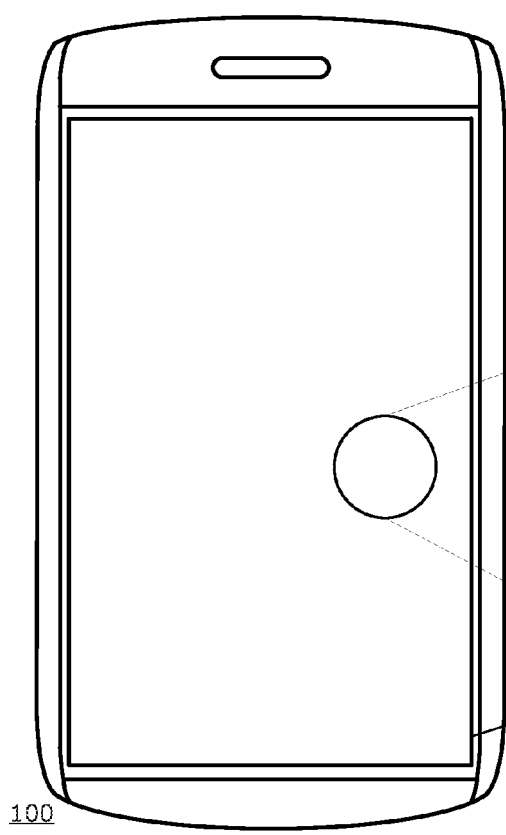
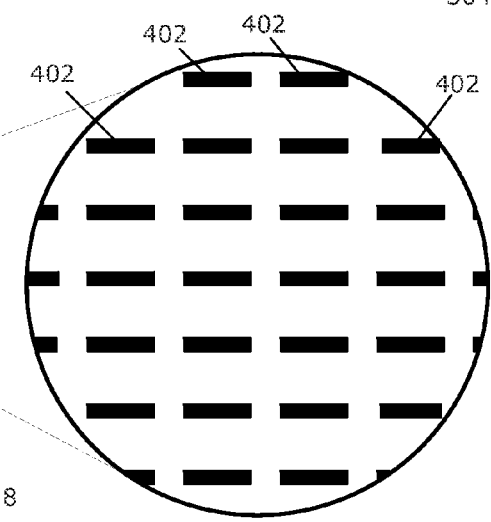
FIG. 2
FIG. 3
FIG. 4

SYSTEM AND METHOD OF DETERMINING STYLUS LOCATION ON TOUCH-SENSITIVE DISPLAY

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

BRIEF DESCRIPTION OF THE DRAWINGS

FIG. 2 is a block diagram of a stylus in accordance with the disclosure.

FIG. 3 is a sectional side view of a stylus in accordance with the disclosure.

FIG. 4 is a front view of an electronic device in accordance with the disclosure.

DETAILED DESCRIPTION

Figure 1:
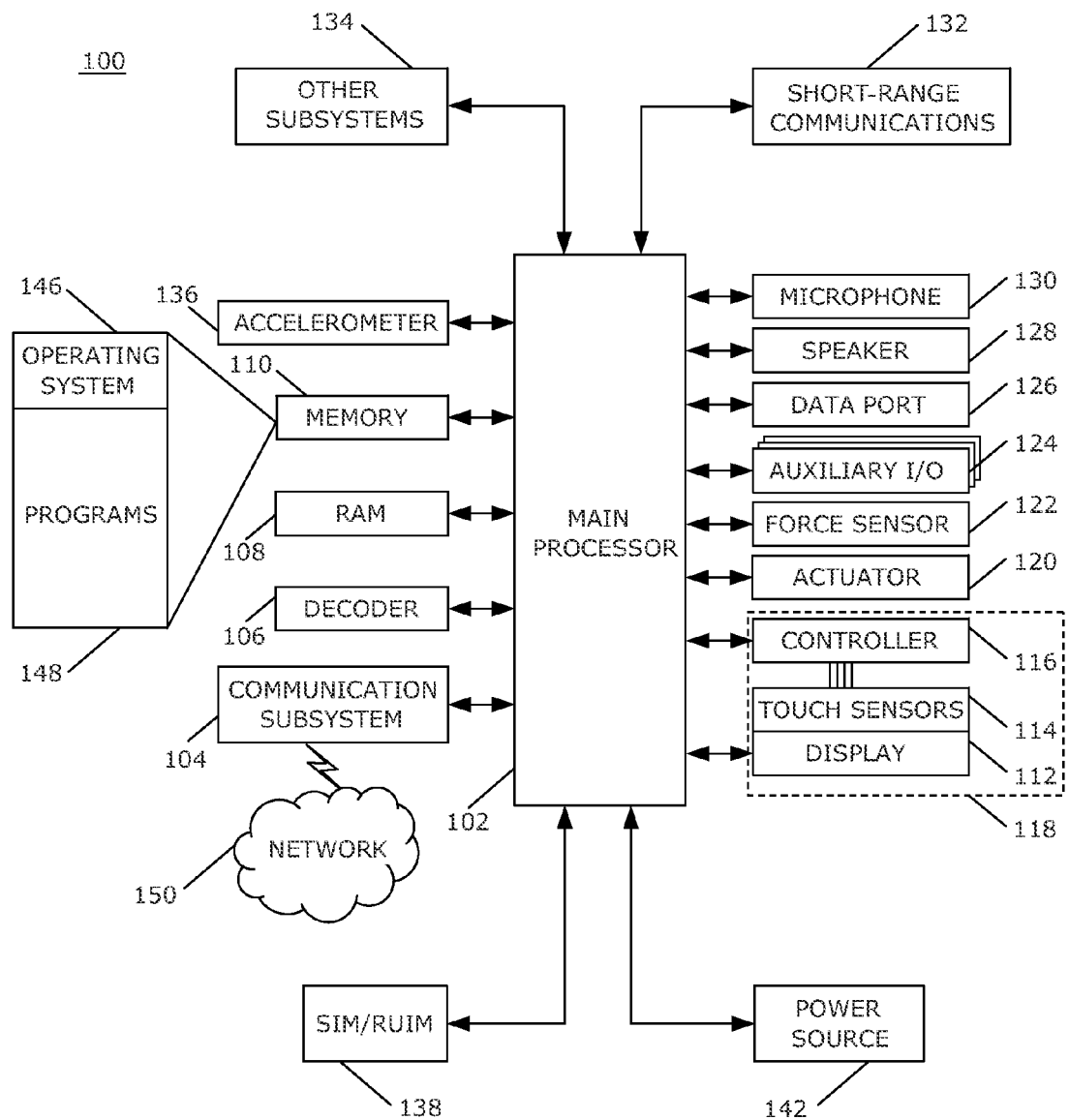
FIG. 1 is a block diagram of a portable electronic device in accordance with the disclosure.

The following describes an electronic device that includes a touch-sensitive display with a plurality of touch sensors that include jumpers that are spaced apart in the touch-sensitive display. The jumpers include attributes to facilitate identification of the relative location of the jumpers. A stylus includes a device configured to obtain data relating to at least one of the jumpers of the touch-sensitive display. A transmitter is operably coupled to a processor of the stylus and configured to transmit information to the electronic device. The information is utilized to identify the relative location of the stylus on the touch-sensitive display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without Wi-Fi communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of an electronic device 100 is shown in FIG. 1. The electronic device 100 includes multiple components, such as a processor 102, e.g., a microprocessor or discrete control circuitry, that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Short-range communications include, for example, Bluetooth communications, near-field communications (NFC), and other short or limited range communications. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

A block diagram of an example of a stylus 200 is shown in FIG. 2. The stylus 200 includes multiple components, such as a processor 202, e.g., a microprocessor or discrete control circuitry, that controls the operation of the stylus 200. The processor 202 is coupled to a power source 212, such as a rechargeable battery or a port to an external power supply.

The processor 202 interacts with other components, such as memory 204, an optional orientation sensor 208, and a transmitter 210. The processor 202 also interacts with a device 206 that is utilized to obtain data, such as optical or image data, relating to one or more attributes of at least one jumper of the touch sensors 114 of the touch-sensitive display 118 of the electronic device 100.

The device 206 is operable to obtain images of touch sensor jumpers of the touch-sensitive display 118. The device 206 may be a camera, optical sensor, or other imaging device, and may include, for example, a complementary metal-oxide-semiconductor (CMOS) active pixel sensor or a charge-coupled device (CCD) sensor to convert light captured into electrical signals, referred to as raw image data. Optionally, the device 206 or stylus 200 may include a light source (not shown), such as a light emitting diode (LED).

Alternatively, the device 206 may be a radio frequency signal detector, acoustic signal detector, magnetic field detector, and so forth, configured to obtain data relating to one or more attributes of jumpers. In these examples, the radio frequency signals, acoustic signals, or magnetic field may be utilized to identify one or more attributes of jumpers to identify the location of the stylus 200 relative to the touch-sensitive display 118. The attributes may include visual attributes, such as shape, pattern, size, orientation, spacing between jumpers, offset or distance between jumpers in different rows or columns, and so forth. Rows of jumpers may be identifiable based on one attribute and columns may be identifiable based on another attribute. The location of a jumper may be identifiable based on the row and the column of the jumper.

An operating system that is executed by the processor 202 may be stored in memory 204. The transmitter 210 is utilized to transmit information, such as image information and/or orientation data from the stylus 200 to the electronic device 100. The information transmitted may be raw image data or may be processed data, depending on the stylus 200. The information may include, for example, an identification of the relative location of the stylus 200 to a fixed position of the touch-sensitive display 118 of the electronic device 100. Information, such as the raw image information or orientation data may be stored in memory 204.

The optional orientation sensor 208, such as an accelerometer or gyroscope, may be utilized to detect motion or may be utilized to determine or calculate an angle of tilt of the stylus 200 with respect to a known object, such as the touch-sensitive display 118. The orientation sensor 208 may be utilized, for example, to detect acceleration or motion to begin capturing images, or to detect the orientation of the stylus 200 for determination of the relative orientation of the stylus 200 to the electronic device 100.

A sectional side view of an example of a stylus 200 is shown in FIG. 3. The stylus 200 includes a body 302 in which the components of the stylus 200 are housed. The body 302 is pen shaped and includes an opening at one end 304 in this example. The device 206, which in this example is a camera, is disposed in the body 302 to capture images through the opening in the end 304 of the stylus 200 and the processor 202 is operably coupled to the device 206 to receive the raw image data in the form of electrical signals.

The processor 202 is also operably coupled to the transmitter 208 to transmit the image information to the electronic device 100. The image information may be in the form of raw image data, for processing by the processor 102 of the electronic device 100. Alternatively, the image information may be processed data. For example, the data may be processed to identify the location of the camera 206 relative to the touch-sensitive display 118 of the electronic device 100. To identify a relative location of the stylus 200 on the touch-sensitive display 118, the stylus 200 may include information stored in memory 204 relating to the touch sensor jumpers of the touch-sensitive display 118. Each of the touch-sensor jumpers of the touch-sensitive display 118 may be unique such that the location of the stylus 200 on the touch-sensitive display 118 is identified based on one or more attributes, of one or more touch-sensor jumpers in the image obtained utilizing the device 206. At least one attribute of a jumper(s) in an image obtained utilizing the camera is compared to attributes of the jumpers of the touch-sensitive display by comparing image data to data stored in memory 204 to identify the location of the stylus 200 relative to the touch-sensitive display 118. The location may include, for example, x and y coordinates of the touch-sensitive display 118. The location of the stylus may optionally utilize the same coordinate system utilized by the touch sensors 114 or pixels of the display 112.

A front view of an electronic device 100 is shown in FIG. 4. The touch-sensitive display 118 includes touch sensors 114, also referred to as touch-sensing electrodes. The touch-sensors 114 are operably coupled to the controller 114 and detect touches on the touch-sensitive display 118. The touch sensors 114 are not illustrated in FIG. 4 for the purpose of clarity.

The touch sensors 114 include drive electrodes and sense electrodes that may be disposed generally on one layer or plane of the touch-sensitive display 118. When the drive electrodes and the sense electrodes are disposed on one layer, one set of electrodes crosses over or under the other set of electrodes. For example, the sense electrodes may cross over the drive electrodes utilizing jumpers 402 such that the sense electrodes are not electrically connected to the drive electrodes. The touch-sensitive display 118 may include a plurality of jumpers 402 where the sense electrodes cross over the drive electrodes. Alternatively, the touch-sensitive display 118 may include a plurality of jumpers 402 where the drive electrodes cross over the sense electrodes. The jumpers 402 may be regularly spaced in a grid pattern in the touch-sensitive display 118. The centers of adjacent jumpers on the touch-sensitive display 118 may be spaced apart, for example, by about 4 millimeters. The jumpers 402 are shown in FIG. 4 for the purpose of illustration, but are not visible to the eye when looking at the front view of the electronic device 100. The image of the jumpers 402 is obtained utilizing the device 206 of the stylus 200 when the stylus 200 is held at an angle relative to the touch-sensitive display 118. For the sake of simplicity, the jumpers 402 are shown in the example of FIG. 4 with uniform shapes that are uniformly sized and uniformly spaced. The jumpers 402 may alternatively have different shapes, including non-uniform shapes, and may be non-uniformly sized and/or non-uniformly spaced for the purpose of identification by image, such as described below.

Each of the jumpers 402 of the touch-sensitive display 118 may be unique. A jumper 402 may be identified based on at least one attribute such as shape, pattern, size, spacing between jumpers 402, offset or distance between jumpers 402 in different rows or columns, and so forth. The attribute(s) may be utilized to identify the location of any jumpers 402 on the touch-sensitive display 118 from the image data received from the device 206. The attribute(s) may also be utilized to identify the orientation of the stylus 200 relative to the jumper(s) 402, and thus to identify the relative location of the stylus 200 to the electronic device 100. The electronic device 100 and/or the stylus 200 may store values that are numerical representations of the attributes in association with a location of the jumper 402. For example, a size, shape, orientation, or pattern of a jumper 402 may be identified, based on image data obtained by the stylus 200, and compared to known values of the attributes of the jumpers 402 of the touch-sensitive display 118. A look-up table, stored in memory 110 or in memory 204, may be utilized to store the association of the values of the attributes with locations of the jumpers 402. The associated location of a jumper 402 may be identified based on one or more values of the attributes associated with the jumpers 402. In one example, each jumper 402 of the touch-sensitive display 118 is unique and may be identified from an image of the jumper 402 obtained by the device 206 based on one or more attributes that result in uniqueness for each jumper. Alternatively, the jumpers 402 may be unique in groups, such as each row or each column having unique attributes, and the special offset between the rows or columns may be sufficiently unique to identify the location of the jumper 402 on the touch-sensitive display 118.

Figure 5:
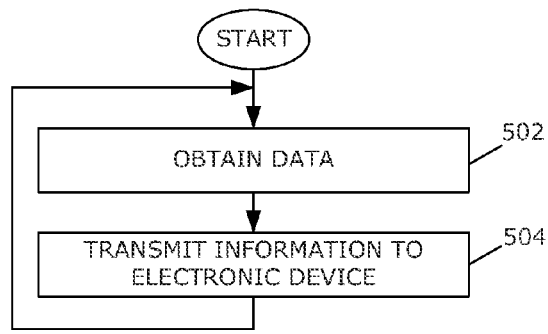
FIG. 5 is a flowchart illustrating a method of obtaining data in accordance with the disclosure.

A flowchart illustrating a method of obtaining data relating to an attribute of a jumper 402 of the electronic device 100 is illustrated in FIG. 5. The method may be carried out by software executed, for example, by the processor 202. Coding of software for carrying out such a method is within the scope of a person of ordinary skill in the art given the present description. The method may contain additional or fewer processes than shown and/or described, and may be performed in a different order. Computer-readable code executable by the processor 202 of the stylus 200 to perform the method may be stored in a computer-readable storage medium, device, or apparatus, which may be a non-transitory or tangible storage medium, device, or apparatus.

The method may be performed, for example, when the stylus 200 touches the touch-sensitive display 118 of the electronic device 100. Data relating to an attribute of one or more jumpers 402 is obtained 502. The data may be, for example, raw image data obtained 502 by converting captured light into electrical signals. The image data may include data for one or more jumpers 402. The stylus 200 may capture images at a relatively low rate such that the time between capturing images is relatively long when no jumper is present in a captured image and may capture images at an increased rate such that the time between capturing images is decreased when a jumper is detected. A jumper may be detected based on the raw image data. Alternatively, the stylus 200 may always be on and may continually capture images at the same rate. Optionally, the stylus 200 may include a button to manually turn on the stylus to capture images, or may include a sensor, such as a proximity, pressure, or force sensor, to detect when the stylus 200 contacts the touch-sensitive display 118 and, in response to detecting that the stylus is in contact with the touch-sensitive display 118, to begin capturing images. Alternatively, the housing of the stylus may be conductive, and the touch sensors 114 may detect when the stylus 200 contacts the touch-sensitive display 118.

Information is transmitted 504 to the electronic device 100 via the transmitter 208 of the stylus 200. The information may include raw data or processed data. Other data may also be transmitted to the electronic device 100. For example, orientation data from the optional orientation sensor 210 may be transmitted to the electronic device 100. In this example, the information is raw image data that is transmitted to the electronic device 100 for processing by the processor 102 of the electronic device 100. The information may be sent to the electronic device 100 utilizing, for example, short-range communications. The process may be repeated as the stylus 200 remains in contact with the touch-sensitive display 118 of the electronic device 100. The stylus 200 may be stationary relative to the touch-sensitive display 118 while maintaining contact with the touch-sensitive display 118 or may move relative to the touch-sensitive display 118 while maintaining contact with the touch-sensitive display 118. Maintaining contact with the touch-sensitive display 118 includes being within a threshold distance of the touch-sensitive display 118.

The process is repeated to facilitate identification of the location during movement of the stylus 200 on the touch-sensitive display 118. Images of touch-sensor jumpers 402 may be repeatedly obtained and image information may be transmitted to the electronic device 100. The stylus 200 may repeatedly capture images. For example, when a jumper 402 is detected, the stylus 200 may continue to obtain images. Alternatively, the stylus 200 may continue to obtain images when the stylus 200 is within a threshold distance from the screen, as determined based on a previous captured image or based on data from a sensor, such as a proximity, touch, pressure, or force sensor.

Figure 6:
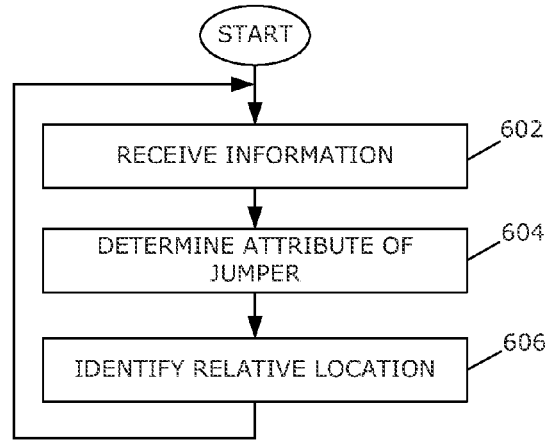
FIG. 6 is a flowchart illustrating a method of identifying a location of the stylus in accordance with the disclosure.

A flowchart illustrating a method of identifying a location of the stylus 200 on the touch-sensitive display 118 of the electronic device 100 is illustrated in FIG. 6. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by the processor 102 of the electronic device 100 to perform the method may be stored in a computer-readable storage medium, device, or apparatus, which may be a non-transitory or tangible storage medium, device, or apparatus.

The information transmitted from the stylus 200 is received 402 by the electronic device 100. In this example, the information includes raw image data that includes data relating to an image of at least one jumper 402 of the touch-sensitive display 118. The information may also include, for example, an angle of tilt of the stylus 200. The information may be received utilizing the short-range communication system 132. The information is processed to determine 604 an attribute of the jumper(s) 402. The information may be processed to identify the orientation of the jumper 402 relative to the stylus 200. The angle of tilt of the stylus 200 may be determine with information from the accelerometer 136 to identify the angle of the stylus 200 relative to the touch-sensitive display 118 of the electronic device 100. One or more values related to the attribute(s), such as described above, may be determined. The information is utilized to identify 606 the location of the stylus 200 on the touch-sensitive display 118 by comparing one or more values of the attribute(s) of uniqueness of the jumper(s) 402 to at least one value stored in memory, such as memory 110. When a match is identified, the associated location of the jumper(s) 402 may be identified, and the location of the stylus 200 on the touch-sensitive display 118 is identified. The location of the stylus 200 relative to the jumpers 402 is determined based on the obtained image and based on the location of at least one jumper 402 in the image. Because the locations of the jumpers 402 are known, and the position of the stylus 200 relative to the jumpers 402 is determined, the position of the stylus 200 relative to the touch-sensitive display 118 is able to determined. The location of the stylus 200 may include x and y coordinate values that correspond to a known coordinate system of the touch-sensitive display 118. Alternatively, the location may include relative distance, including x and y coordinate distances, between the location of the stylus 200 and a previously determined location of the stylus 200.

The process may be repeated to identify the location of the stylus 200 when contact of the stylus 200 with the touch-sensitive display 118 continues, for example, during movement of the stylus 200 on the touch-sensitive display 118. Thus, image data may be repeatedly received and processed to identify the location of the stylus 200.

Figure 7:
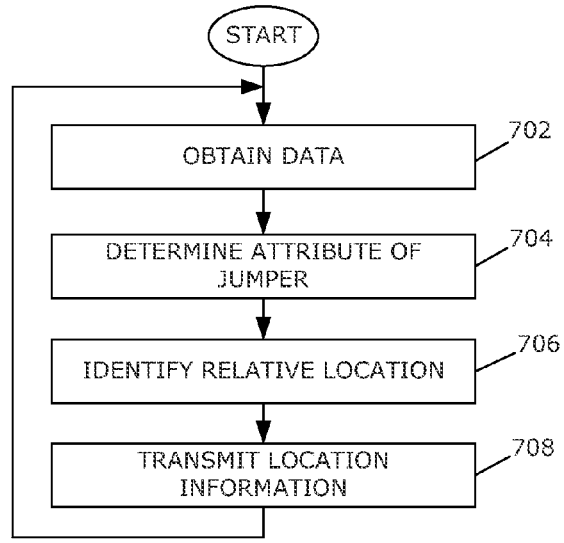
FIG. 7 is a flowchart illustrating another method of identifying a location of the stylus in accordance with the disclosure.

A flowchart illustrating another method of identifying a location of the stylus on the touch-sensitive display 118 of the electronic device 100 is illustrated in FIG. 7. The method may be carried out by software executed, for example, by the processor 202. Coding of software for carrying out such a method is within the scope of a person of ordinary skill in the art given the present description. The method may contain additional or fewer processes than shown and/or described, and may be performed in a different order. Computer-readable code executable by a processor of the stylus to perform the method may be stored in a computer-readable storage medium, device, or apparatus, which may be a non-transitory or tangible storage medium, device, or apparatus.

The method may be performed when the stylus 200 touches the touch-sensitive display 118 of the electronic device 100. Data relating to an attribute of a jumper 402 or jumpers 402 is obtained 702. The data may be, for example, image data obtained 702 by converting captured light into electrical signals. The obtained image data includes image data of at least one touch-sensor jumper 402. The data may also include, for example, an angle of tilt of the stylus 200 relative to the electronic device 100. The data is processed to determine 704 at least one attribute of the jumper(s) 402. The data may be processed to identify the location and/or orientation of the stylus 200 relative to the jumper(s) and to determine at least one attribute of the jumper(s) 402. One or more values related to the attribute(s) may be determined. The data is utilized to identify 706 the location of the stylus 200 on the touch-sensitive display 118 by comparing the value(s) of the attributes of the jumper(s) 402 to or values stored in memory, such as memory 110. When a match between the determined values of the attributes and the values stored in memory is identified, the associated location of the jumper(s) 402 is identified and the relative location of the stylus 200 is determined based on the data obtained. Information is transmitted 708 to the electronic device 100. In this example, the information includes an identification of the location of the stylus 200 relative to the touch-sensitive display 118.

Figure 8:
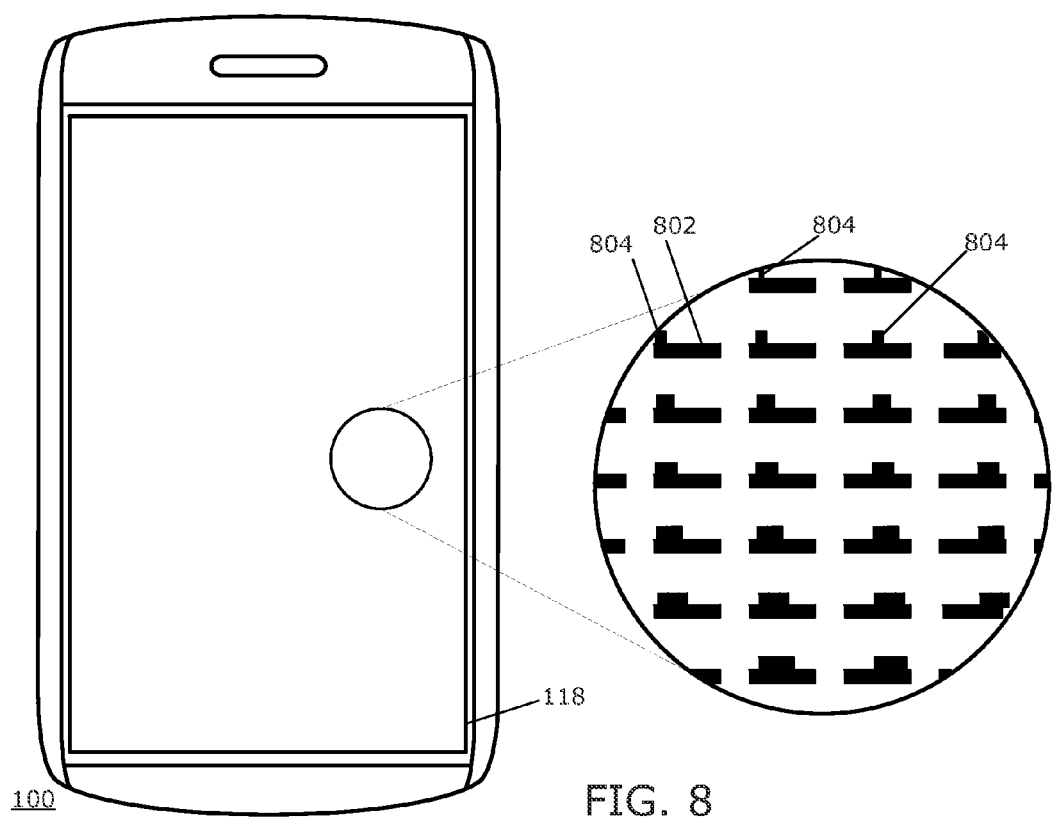
FIG. 8 is a front view of an electronic device in accordance with the disclosure.

A front view of another example of an electronic device 100 is shown in FIG. 8. The touch-sensitive display 118 may include a plurality of jumpers 802 that may be regularly spaced in a grid pattern in the touch-sensitive display 118. The jumpers 802 are shown in FIG. 8 for the purpose of illustration, but are not visible to the eye when looking at the front view of the electronic device 800. The jumpers 802 include an identifier 804, which in this example is an additional piece, part, or section along one side of the jumper 802. The identifiers 804 may be the same material as the jumper 802 and may be formed when the jumpers 802 are formed. The jumper attributes that are utilized to identify the location of the jumper include the size and the location of the identifier 804 in this example. The size and location of the identifier 804 is exaggerated for the purpose of illustration. In this example, the location of the identifier 804 relative to the jumper 802 is different in each column of jumpers 802 such that the identifier 804 is farther to the right side of the touch-sensitive display 118 for a column that is closer to the right side of the touch-sensitive display 118 than another column. The size of the identifier 804 is different in each row such that the identifier 804 is longer in a row of jumpers 802 that is closer to one side, e.g., the bottom, of the touch-sensitive display 118 than another row of jumpers 802 closer to an opposite side, e.g., the top, of the touch-sensitive display 118. Thus, the row and column of the jumper 802 and the associated location on the touch-sensitive display 118 may be determined based on the location and size of the identifier 804.

Utilizing visually unique jumpers of the touch-sensitive display 118, the location of the stylus 200 is determined relative to the touch-sensitive display 118 from image data obtained by the stylus 200. The location information may be utilized to provide input to the electronic device 100, for example, for drawing on the touch-sensitive display 118, identifying input of displayed selection options with the stylus 200, and so forth. Jumpers that are utilized for touch detection may also be utilized to determine the location of the stylus 200 on the touch-sensitive display 118. Additional printing or patterning of indicia on or in the touch-sensitive display 118 is not required.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A stylus for use with a touch-sensitive display comprising a plurality of touch sensors including a plurality of drive electrodes and a plurality of sense electrodes disposed in a layer of the touch-sensitive display, the stylus comprising:
   a device configured to obtain data relating to an attribute of at least one touch sensor jumper of a plurality of touch sensor jumpers of the touch-sensitive display of an electronic device, each touch sensor jumper being a conductive jumper disposed at a location of the touch-sensitive display at which a drive electrode of the plurality of drive electrodes and sense electrode of the plurality of sense electrodes cross each other such that the drive electrode is not electrically connected to the sense electrode;
   a processor operably configured to receive the data from the device;
   a transmitter operably coupled to the processor and configured to transmit, to the electronic device, information based on the data.

2. The stylus according to claim 1, wherein the data comprises raw image data.

3. The stylus according to claim 1, wherein the processor is configured to identify a location of the device relative to the touch-sensitive display based on the data.

4. The stylus according to claim 1, wherein the information comprises an identified location of the device relative to the touch-sensitive display.

5. The stylus according to claim 1, wherein the processor is configured to identify an orientation of the device.

6. An electronic device comprising:
   a touch-sensitive display including a plurality of touch sensors comprising a plurality of drive electrodes and a plurality of sense electrodes configured to detect touches on the touch-sensitive display, wherein the touch sensors include touch-sensor jumpers that are spaced apart in the touch-sensitive display, each of the touch sensor jumpers being a conductive jumper disposed at a respective location of the touch-sensitive display at which a drive electrode of the plurality of drive electrodes and sense electrode of the plurality of sense electrodes cross each other such that the drive electrode is not electrically connected to the sense electrode, and wherein a plurality of the touch-sensor jumpers include attributes to facilitate identification of a location of a stylus relative to the jumpers;
   a processor coupled to the touch-sensitive display;

a receiver coupled to the processor and configured to receive information transmitted from the stylus.

7. The electronic device according to claim 6, wherein the attribute comprises a shape of the jumpers.

8. The electronic device according to claim 6, wherein the processor is configured to receive raw image data transmitted from the stylus to the receiver.

9. The electronic device according to claim 6, wherein the processor is configured to identify a location of the stylus relative to the touch-sensitive display based on the information transmitted from the stylus.

10. The electronic device according to claim 6, wherein the processor is configured to receive an identification of a location of the stylus relative to the touch-sensitive display.

11. The electronic device according to claim 6, wherein the processor is configured to identify a location of the stylus relative to the touch-sensitive display based on the information.

12. The electronic device according to claim 6, wherein the processor is configured to identify an orientation of the stylus based on the information.

13. A method comprising:
obtaining data relating to an attribute of at least one touch sensor jumper of a plurality of touch sensor jumpers of a touch-sensitive display comprising a plurality of drive electrodes and a plurality of sense electrodes of an electronic device, each of the plurality of touch sensor jumpers being a conductive jumper disposed at a respective location of the touch-sensitive display at which a drive electrode of the plurality of drive electrodes and sense electrode of the plurality of sense electrodes cross each other such that the drive electrode is not electrically connected to the sense electrode;
determining the attribute of the at least one touch sensor jumper based on the obtained data;
identifying a location of a stylus relative to the touch-sensitive display by comparing the attribute to attributes of the plurality of touch sensor jumpers including the at least one touch sensor jumper of the touch-sensitive display.

14. The method according to claim 13, wherein the attribute comprises a shape of the jumpers.

15. The method according to claim 13, wherein the information comprises image data obtained from a device of a stylus.

16. The method according to claim 13, wherein the method is performed at the electronic device and obtaining information comprises receiving, at the electronic device, raw image data transmitted from the stylus.

17. The method according to claim 13, comprising identifying an orientation of the device based on the information.

18. The method according to claim 13, wherein the method is performed by a processor of the stylus, and wherein location data is transmitted to the electronic device.

19. A non-transitory computer-readable storage device having computer-readable code stored thereon, the computer-readable code executable by at least one processor of the electronic device to perform the method of claim 13.

20. A system comprising
a stylus including:
a device configured to obtain data relating to an attribute of at least one of a plurality of touch sensor jumpers;
a first processor operably coupled to the device to receive the data;
a transmitter operably coupled to the first processor and configured to transmit information based on the data;
an electronic device including:
a touch-sensitive display including a plurality of touch sensors comprising a plurality of drive electrodes and a plurality of sense electrodes configured to detect touches on the touch-sensitive display, wherein the touch sensors include the plurality of touch sensor jumpers that are spaced apart in the touch-sensitive display, each of the touch sensor jumpers being a conductive jumper disposed at a respective location of the touch-sensitive display at which a drive electrode of the plurality of drive electrodes and sense electrode of the plurality of sense electrodes cross each other such that the drive electrode is not electrically connected to the sense electrode, and wherein a plurality of the touch-sensor jumpers include attributes to facilitate identification of a location of the stylus relative to the jumpers;
a second processor coupled to the touch-sensitive display;
a receiver coupled to the second processor and configured to receive the information from the stylus.

* * * * *